(12) United States Patent
Dadd et al.

(10) Patent No.: US 9,234,554 B2
(45) Date of Patent: Jan. 12, 2016

(54) SPRINGS AND SPRING ASSEMBLIES

(75) Inventors: Michael William Dadd, Summertown (GB); Paul Brian Bailey, Summertown (GB)

(73) Assignee: Isis Innovation Limited, Summertown, Oxford (GB)

( * ) Notice: Subject to any disclaimer, the term of this patent is extended or adjusted under 35 U.S.C. 154(b) by 213 days.

(21) Appl. No.: 13/381,434

(22) PCT Filed: Jun. 3, 2010

(86) PCT No.: PCT/GB2010/001100
§ 371 (c)(1),
(2), (4) Date: Mar. 16, 2012

(87) PCT Pub. No.: WO2011/001132
PCT Pub. Date: Jan. 6, 2011

(65) Prior Publication Data
US 2012/0160091 A1  Jun. 28, 2012

(30) Foreign Application Priority Data
Jul. 3, 2009  (GB) .................................. 0911629.4

(51) Int. Cl.
*F01B 31/00* (2006.01)
*F16F 1/02* (2006.01)
(Continued)

(52) U.S. Cl.
CPC . *F16F 1/027* (2013.01); *F16F 1/10* (2013.01); *F16F 3/02* (2013.01); *Y10T 29/49609* (2015.01); *Y10T 29/53613* (2015.01)

(58) Field of Classification Search
CPC ........... F16F 1/027; F16F 1/324; F16F 1/374; F16F 1/377; F16F 15/1213; F16F 1/10; F16F 1/326

USPC ......................................... 267/160, 161, 162
See application file for complete search history.

(56) References Cited

U.S. PATENT DOCUMENTS 3,312,125 A * 4/1967 Durouchoux ................. 74/570.1
4,296,851 A * 10/1981 Pierce ......................... 192/84.94
(Continued)

FOREIGN PATENT DOCUMENTS

DE   10312977 A1   10/2004
GB   1446729 A   8/1976
(Continued)

OTHER PUBLICATIONS

International Search Report received in PCT/GB2010/001100, Jun. 23, 2011.
(Continued)

*Primary Examiner* — Xuan Lan Nguyen
(74) *Attorney, Agent, or Firm* — Bell & Manning, LLC

(57) ABSTRACT

Various arrangements are disclosed based on springs formed from a plurality of individual resilient arms, including a spring having a substantially planar form in an unloaded state and rotational symmetry of at east order two about a symmetry axis perpendicular to the plane of the spring, the spring comprising: an inner hub and an outer hub, the inner hub being radially inward with respect to the outer hub; a plurality of resilient connecting arms each connected at an inner end to the inner hub and at an outer end to the outer hub, the plurality of resilient connecting arms being configured to provide a restoring force parallel to the symmetry axis when the inner and outer hubs are displaced relative to each other along the symmetry axis; wherein the inner hub, the outer hub and each of the plurality of resilient connecting arms are formed as physically separate elements and are connected to each other during assembly to form the spring.

20 Claims, 13 Drawing Sheets

(51) Int. Cl.
*F16F 1/10* (2006.01)
*F16F 3/02* (2006.01)

(56) References Cited

U.S. PATENT DOCUMENTS

| | | | | |
|---|---|---|---|---|
| 4,531,761 | A * | 7/1985 | von Sivers | 280/785 |
| 4,795,012 | A * | 1/1989 | Durum | 464/99 |
| 5,149,066 | A * | 9/1992 | Snaith et al. | 267/136 |
| 5,167,424 | A * | 12/1992 | Baggio et al. | 280/602 |
| 5,234,376 | A * | 8/1993 | Chimner et al. | 464/27 |
| 5,307,913 | A * | 5/1994 | Szadkowski | 192/70.17 |
| 5,322,149 | A * | 6/1994 | Szadkowski | 192/70.17 |
| 5,580,028 | A * | 12/1996 | Tomczak et al. | 248/634 |
| 6,050,556 | A * | 4/2000 | Masuda et al. | 267/161 |
| 6,127,750 | A * | 10/2000 | Dadd | 310/13 |
| 6,443,183 | B1 | 9/2002 | Roorda | |
| 2004/0026840 | A1* | 2/2004 | Eckel et al. | 267/154 |
| 2006/0219514 | A1 | 10/2006 | Matsumura et al. | |

FOREIGN PATENT DOCUMENTS

| | | |
|---|---|---|
| GB | 1528057 A | 10/1978 |
| GB | 2262795 A | 6/1993 |
| GB | 2262797 A | 6/1993 |
| JP | S53-072071 | 6/1978 |
| JP | H05-280554 | 10/1993 |
| JP | H09-250828 | 9/1997 |
| JP | 2003-181569 | 7/2003 |
| JP | 2006-029137 | 2/2006 |
| JP | 2008-008561 | 1/2008 |

OTHER PUBLICATIONS

Written Opinion received in PCT/GB2010/0011, Jan. 3, 2012.
Search Report received in GB0911629.4, Nov. 4, 2009.
Office Action issued in JP Application No. 2012-516838, Mar. 4, 2014.
English language translation of Office Action issued in JP Application No. 2012-516838, Mar. 4, 2014.

* cited by examiner

PRIOR ART

PRIOR ART

SPRINGS AND SPRING ASSEMBLIES

CROSS-REFERENCE TO RELATED APPLICATIONS

This application is a National Stage of International Application No. PCT/GB2010/001100, filed Jun. 3, 2010, which claims the benefit of GB Patent Application No. GB 0911629.4, filed Jul. 3, 2009, the contents of which are herein incorporated by reference.

The efficiency and lifetime of most present day thermodynamic machines is achieved through the use of lubricants. These are materials that are able to transmit large forces between moving components with low friction and little wear.

There are a number of applications where the use of conventional lubricants such as oil can cause problems. For example in a Stirling cycle cryo-cooler there are piston/cylinder assemblies. If these are driven by conventional crank mechanisms then the use of lubricants is highly desirably for long life and good efficiency. However the cooler system also includes heat exchangers that may be operating at a low temperature e.g. 100 K or below. If oil is allowed to migrate from the piston/cylinder area to the low temperature heat exchangers, the oil will tend to solidify and block up the heat exchanger passages with resulting loss of performance.

A technology that has been developed to avoid this problem dispenses with crank mechanisms altogether and instead adopts an entirely linear configuration. The large side loads associated with crank mechanisms are avoided and oil free operation is possible. Typical components of such a system are: a linear suspension system that uses flexures to define an accurate linear motion; a piston/cylinder assembly where the piston is guided by the suspension system so as to maintain a constant clearance within the cylinder; and a linear transducer, attached to the moving components, which allows power to be transferred into and out of the moving assembly.

This technology has been successfully used in cooling systems for space applications and has become of increasing interest in other applications where oil-free operation is desirable.

A typical linear suspension system consists of two sets of flexures. These are components that are able to provide relative movement by flexing i.e. by elastic deformation. Flexing removes the need for movement between contacting surfaces and eliminates the possibility of friction or wear. Flexures are generally made from thin metal sheet such as stainless steel.

A design of flexure that has been widely used is commonly referred to as a spiral spring. Two examples 100 and 300 are illustrated in FIGS. 1 to 4.

Spiral springs are formed from a thin, flat disc of material. The disc is machined so as to produce two or more rotationally symmetric curved flexing arms 101/301 that connect inner attachment areas 102/302 to outer attachment areas 104/304 at the periphery.

In FIGS. 1 and 2, the inner and outer attachment areas (clamp areas), 102 and 104 respectively, are in the form of annuli. FIG. 1 shows the profile of the spring 100. FIG. 2 shows the clamped areas 102/104 as hatched regions. FIGS. 3 and 4 show an alternative arrangement 300, where the inner and outer attachment areas, 302 and 304 respectively, are more complex in shape. In this instance, the outer clamping area 304 is a number of individual pads. FIG. 3 shows the profile of the spring 300 and FIG. 4 shows the clamping areas 302/304 as hatched regions. In both designs, the spring 100/300 is of one piece construction.

Axial movement between the inner 102/302 and outer 104/304 attachment areas causes the resilient connecting arms 101/301 to flex and providing that the material does not yield this movement is both reversible and repeatable.

A single spring has poor torsional stiffness about an axis within the plane of the spring. However if two or more springs are aligned and connected to form two axially separated sets then the torsional stiffness is greatly increased. A complete assembly can then operate as a type of linear bearing where the movement is entirely taken up by the flexing of the resilient connecting arms and wear/friction processes are eliminated. The resilient connecting arms are shaped to minimise the maximum stress for a given deflection. Providing the stress is not high enough to fatigue the material, the spring can have a very long life—in principle if it is not subject to fretting or corrosion, the life can be infinite.

An example of such an assembly 500 is shown in FIG. 5. In this example, there are two sets of two springs 508A/508B/510A/510B connected by inner and outer hubs. Within each set of springs 508/510, the individual springs 508A/508B and 510A/510B are separated by shims 512. These are used to prevent contact between neighbouring springs as such contact can cause fretting and premature failure. The axial stiffness of the complete assembly 500 can be increased by increasing the number of springs but it is generally desirable to keep the number down by making individual springs as stiff possible.

The linear motion defined by a spiral spring suspension system is a consequence of the rotational symmetry of the spring's geometry. The accuracy of the linear movement is therefore limited by the accuracy of the geometry that is actually achieved. This in turn is determined by both the manufacture of the spring and the accuracy with which the spring is clamped. The positions of clamping forces set the boundary conditions for the resilient connecting arm deflection and these also need to have accurate rotational symmetry.

In existing spring designs the accuracy of the spring geometry is ensured by making the spring a single component. The resilient connecting arm profiles are then all machined at the same time and the accuracy is limited primarily by the machining process. A machining process that has been widely used is a chemical process referred to as photo-etching.

The accuracy with which the clamping forces are positioned has generally been set by standard engineering tolerances used with the fasteners. For example, if the springs are clamped with M3 screws then the clearance holes are typically 3.2 mm in diameter, giving a location error of +/−0.1 mm. While this level of precision is not very high, experience has shown that it is good enough for many applications.

For a flexure bearing in a compressor application, there is typically a requirement to achieve (or exceed) minimum values of stroke, radial stiffness and axial stiffness for a specified envelope and operating frequency.

The radial stiffness generally needs to be substantially higher than the axial stiffness and this is achieved by arranging for the minimum resilient connecting arm width to be several times bigger than the spring thickness. For example for a width of 2 mm and spring thickness of 0.25 mm the aspect ratio is 8. The ratio of stiffness is roughly proportional to the cube of the aspect ratio and this will result in a stiffness ratio of ~500.

The total number of flexure cycles in the lifetime of the compressor is very high (typically $>10^9$), so the flexure is clearly subject to fatigue and this must be considered in the design.

The stroke and stiffness requirements generally make conflicting demands. For example, reducing the thickness of a spring will reduce the stress in the resilient connecting arms for a given deflection and will allow a larger stroke for a given maximum stress level. However, reducing the thickness will also reduce the axial and radial stiffness values. One of the main challenges in designing spiral springs is to achieve high values of both stiffness and stroke for a given envelope (i.e. size/shape of spring cross-section, perpendicular to axis of displacement). In general, this translates to using a material that has a high fatigue strength in a design that has an even stress distribution—in particular it is important to avoid local stress concentrations.

Finite element stress analysis software has been successfully used to improve spiral spring designs. Whilst it is not usually possible to arrive at a completely uniform stress distribution, local peak values can be reduced, resulting in significantly better performance.

The stress at which a component is expected to fail is not single valued, but is determined by the previous stress history, as failure may be due to an accumulation of damage. A particular instance of importance in engineering is where the component stress is varied over many cycles. This type of stress regime is termed fatigue and it is generally found that the stress at which failure occurs decreases with an increasing number of cycles. Different materials demonstrate differing behaviour when subjected to cyclic stress. For some the strength continues to decline as the number of cycles increases. For others, it is found that the strength decreases to a certain value then remains constant. Materials that exhibit the latter behaviour are said to have a fatigue limit and the associated minimum strength is referred to as the fatigue strength. In applications where fatigue is significant, materials that exhibit a fatigue limit are preferred. Ferrous alloys generally demonstrate a high fatigue limit and these are the most generally used. For some materials there is a correlation between fatigue strength and the hardness (and yield strength) of the material; materials with high fatigue strength are often very hard.

Special grades of stainless steel have been developed for compressor valve applications where fatigue resistance is a major requirement. These alloys have very high fatigue strength, good corrosion resistance and are available in flat sheet form. They are not expensive, they are very well suited to spiral spring applications and have been used widely used. An example of such an alloy is Sandvik's "Hiflex".

Achieving high fatigue strengths in a finished component can be difficult. Choosing the material is clearly important as it determines the maximum fatigue strength that can be achieved. Equally important is consideration of the manufacturing process as this can have a big influence.

The nominal fatigue strength of a material is a value that sets a maximum peak stress value that can occur anywhere in component subject to fatigue. Features of a component's geometry or surface finish can give rise to localised peak values that are significantly higher than the mean stresses that might be calculated. Such features, termed stress raisers, are very detrimental and can lead to failure at low mean stress values. For example, cracks in a surface that is subject to a cyclic tensile stress may cause premature failure well below fatigue values based on mean stresses.

Machining processes generally degrade the fatigue properties of a material by leaving cracks in the surface or by locally heating the alloy and changing its temper. Processes such as "super-finishing" have been developed that can remove surface damage after machining, resulting in much improved fatigue performance.

In the manufacture of the spiral spring it is desirable to find a combination of machining and finishing processes that allow the full fatigue strength of the material to be utilised. In existing designs the spiral arms are usually defined by thin slots in the material, and typically the regions where peak stresses occur are along the sides and ends of these slots. The one-piece design does not allow the effective use of finishing processes because the edges along the spiral arms that are highly stressed are inaccessible to the media that are used in these processes. This restricts the choice of machine processes to those that leave a usable surface finish without such finishing processes.

Photo-etching of spring profiles has been a machining process that has been widely used. It can result in high quality machined components that show reasonably good fatigue resistance, but it has a very significant disadvantage in that quality control is not very easy, yields can be low, and the chemical process involved may result in the formation of microcracks on the etched surfaces.

The manufacturing cost for existing spring designs is relatively high because photo-etching is not a low cost manufacturing process and this basic cost is increased significantly when quality control and low yields are taken into account.

In summary, in the prior art described above, the attainment of an accurate spring geometry is achieved by machining the spring as a single component. While this approach is perceived as being advantageous from the point of view of producing the required accuracy, it significantly restricts the machining and finishing processes that can be used. Ultimately, this results in springs that are relatively expensive and which do not make the most of the material properties. The present invention seeks to address at least some of these shortcomings of the prior art.

According to an aspect of the invention, there is provided a spring having a substantially planar form in an unloaded state and rotational symmetry of at least order two about a symmetry axis perpendicular to the plane of the spring, said spring comprising: an inner hub and an outer hub, said inner hub being radially inward with respect to said outer hub; a plurality of resilient connecting arms, each connected via an inner planar attachment region at an inner end to said inner hub and via an outer planar attachment region at an outer end to said outer hub, the planes of said inner and outer planar attachment regions being perpendicular to said symmetry axis, said plurality of resilient connecting arms being configured to provide a restoring force parallel to said symmetry axis when said inner and outer hubs are displaced relative to each other along said symmetry axis; wherein said inner hub, said outer hub and each of said plurality of resilient connecting arms are formed as physically separate elements and are connected to each other during assembly to form said spring.

Thus, in contrast to single piece spiral springs where the inner and outer hubs are integral with each other, the inner and outer hubs according to this disclosure are connected to each other via separate, resilient connecting arms. The spring is assembled by aligning the inner and outer hubs and the resilient connecting arms and fastening them together via the inner and outer planar attachment regions. This process can be facilitated by location features provided in the hubs and connecting arms.

The hubs and connecting arms are physically separate in the sense that they are manufactured as individual items and each has an identifiable external surface that defines its extent. When they are brought into contact with each other, there will generally be an identifiable interface between them (marking a discontinuity in composition, structure and/or lattice orientation, for example). There may be a degree of mixing between the materials of two elements as they are connected together. For example, spot welding, soldering and/or certain adhesives may cause such mixing, but there will still be an interface marking the point at which one element ends and the next element begins. In the case of spot welding, some melting and mixing of both interfaces might occur, but this is localized and does not destroy the interface between the elements, nor otherwise make it impossible to distinguish one element from another (i.e. to determine that the two elements have been connected together rather than formed as a single integral component). In the case of soldering and adhesives, the presence of these different materials will itself help to define the interface separating the elements. In prior art arrangements where the hubs and connecting arms are formed from a single piece of material, by contrast, no such interfaces are present and the hubs and connecting arms are integral with each other rather than being separate items.

The accurate geometry required for the spring may be achieved by the use of location features present in the hubs and the connecting arms. Such location features may be intrinsic to the spring arm function of the hubs and the connecting arms (i.e. they contribute to the restoring force provided by the spring). Alternatively or additionally, they may be added purely for the purposes of alignment.

In some instances the fastening means may not be readily removed, e.g. where the means involves soldering, welding or adhesive processes. In these instances, the assembly may only occur once and the components cannot be disassembled for reuse.

Where the fastening means can be readily removed (e.g. where bolts or rivets are used), the components will detach from each other automatically or be detachable with a minimum of applied force and without any damage to the components. After the components have been detached in this way, they may be reassembled. The assembly process may thus be reversible.

In general, the fastening means will act to press the inner and outer planar attachment regions against the inner and outer hubs in a direction parallel to the symmetry axis of the spring.

The difficulties associated with manufacturing the single piece spiral springs of the prior art have been discussed above. These include the fact that a one-piece design does not allow the effective use of many finishing processes (such as "super finishing") because the edges along the spiral arms that are highly stressed are inaccessible to the media that are used in these processes. This restricts the choice of machine processes to those that leave a usable surface finish without such finishing processes being applied. An example of such machine processing is photo-etching, but this technique has several disadvantages, including that quality control is difficult, yields can be low and the chemical process involved can leave micro-cracks in the etched surfaces.

The present invention avoids these problems because the resilient connecting arms are not integral with the inner and outer hubs and can be treated and finished as separate items (i.e. prior to assembly of the spring). There are no narrow gaps or slots which would cause problems for finishing processes. Indeed, the present invention could be manufactured effectively using a combination of stamping (or fine blanking) and super-finishing, which could greatly reduce costs in comparison with the photo-etching based manufacture. This process is widely used to manufacture low cost flapper valves (reed valves) for refrigerator compressors where high fatigue strength is also an important requirement. Stamping is not a viable manufacturing process for existing one piece spring designs as the dies required to produce the thin slots in (typically hard) material would be very expensive and not durable.

Location features may be provided for assisting alignment of the resilient connecting arms with the inner and outer hubs. These may comprise, for example, cylindrical holes in the resilient connecting arms and inner and outer hubs for cooperation with cylindrical alignment members insertable within the cylindrical holes. This arrangement is simple to assemble and manufacture has been shown to be capable easily of providing a level of alignment that is superior to that achieved in existing single piece spiral springs. The cylindrical alignment members may be left in the holes after alignment has been achieved to help maintain alignment or they can be removed.

The resilient connecting arms may be arranged in a plurality of stacks, each resilient connecting arm in a given stack being aligned with all of the other resilient connecting arms in the same stack, along a direction parallel to the symmetry axis. This arrangement allows the stiffness of the spring to be adapted (increased) easily to the demands of a particular application, without requiring any modification of the basic resilient connecting arms. A wide variety of springs can therefore be manufactured (assembled) using identical resilient connecting arms, thus allowing significant economies of scale to be made in the manufacturing process.

Location features can be provided that serve to align the resilient arms both with each other (within a stack) and with respect to the inner and outer hubs. For example, the location features may comprise cylindrical holes and/or slots and corresponding cylindrical alignment members. An advantage of using the same location features for the two functions is that it minimizes the space required for the location features, which may be important where the overall envelope (cross-sectional area in the plane of the spring) is to be minimized.

The location features may comprise a mix of fully-constraining location features and partially-constraining location features. The fully-constraining location features will prevent any movement within the plane of the spring of the part of the resilient connecting arms that are in contact with the location features and the partially-constraining location features will prevent movement within the plane of the spring of the part of the resilient connecting arms that are in contact with the location features only in certain predefined directions. For example, the partially-constraining location features may consist of slots that allow linear movement along a predefined line only. This combination of fully-constraining and partially-constraining location features may be deployed in such a way as to ensure that the spring is not over-constrained when there are a large number of resilient connecting arms. For example, this aim may be achieved by appropriate selection of the number of fully-constraining location features, of the number of partially-constraining location features, and of the nature (e.g. orientation) of the partially-constraining location features. Over-constraining can unnecessarily and unpredictably stress the spring, which can lead to reduced performance and/or premature failure.

The resilient connecting arms may be fastened to the inner and outer hubs using a variety of different techniques. For example, they may be connected using screws that cooperate with threaded holes formed in the inner and outer hubs. Contact between the screw head and the resilient connecting arms may be made through a clamping member or washer.

The fastening means may be configured also to align the resilient connecting arms with each other (within a stack) and/or with the inner and outer hubs. For example, the fastening means may comprise a screw with an elongated shoulder portion that cooperates with the interior cylindrical surface of holes formed in the resilient connecting arms and/or with a non-threaded portion of a cylindrical hole formed in the inner or outer hubs.

Combining the fastening means with the hub and/or stack location features reduces the space necessary for these features, which may be useful when the spring is to be miniaturized, for example. The absence of separate location features also means that there is more space available for the fastening means. Thicker screws than would otherwise be possible can therefore be used, for example, which may improve reliability and/or performance.

Alternatively or additionally, cylindrical tubes may be provided for insertion around part of the threaded portion of standard screws. The cylindrical tube engages with the interior cylindrical surface of holes formed in the resilient connecting arms and/or with a non-threaded portion of a cylindrical hole formed in the inner or outer hubs in order to carry out the alignment function, while a part of the screw thread protruding from the end of the cylindrical tube engages with a corresponding threaded portion within the inner or outer hub to carry out the fastening function. An advantage of this approach is that it allows standard screws to be used, which are very cheap, and the cylindrical tubes can be manufactured more cheaply than screws with elongated shoulder portions (where the profile and axial orientation of the shoulder portion is to be formed sufficiently accurately).

The fastening means may be configured to fix each end of said resilient connecting arms to said inner and outer hubs via at least two fixing points. This arrangement has been found most efficient for supporting the rotational forces arising on axial displacement (loading) of the spring.

Each of the resilient connecting arms may be tapered (i.e. "waisted") so as to be thinner in a region towards the middle of the arm relative to regions nearer the inner and outer ends of the arm. For example, the resilient connecting arms may have roughly the same width at the two ends of the connecting arm and get continuously thinner towards the middle of the connecting arm. This arrangement may help to allow a small amount of rotation of the inner hub relative to the outer hub on axial deflection (loading) of the spring, with a minimum of additional stress on the resilient connecting arms. The arrangement also generally helps to reduce peak stress in the arms and allows efficient nesting of the arms.

The number of stacks of resilient connecting arms, or the number of resilient connecting arms if there are no stacks, may be arranged to be greater than the order of the rotational symmetry. In other words, the resilient connecting arms may be arranged in a pattern that has a lower order of rotational symmetry than the maximum which is possible for the number of resilient connecting arms provided. This provides greater flexibility for controlling the shape of the spring envelope (i.e. its profile when viewed along the symmetry axis). For example, the profile may be arranged so as to be relatively compact in a first direction within the plane and relatively elongated in a second direction with the plane, perpendicular to the first direction. This might allow the spring to be used in a device or location with similar spatial constraints.

Furthermore, the outer hub may be configured so as to consist of a plurality of connected or disconnected segments. Where the segments are disconnected, each segment is attached only to outer ends of resilient connecting arms that are nearest neighbours to each other. For example, where the resilient connecting arms are arranged so that the spring profile is compact in a first direction and elongated in a second, perpendicular direction, the segments may be arranged so as to lie substantially parallel to the first direction. Again, arranging the outer hub in this way provides greater flexibility for controlling the shape of the spring envelope.

It is also noted that where the segments are disconnected, additional location features will be required to define the spring geometry. This can be achieved by using more fully the alignment features that are already present in the resilient connecting arms. Alternatively, it is possible to use a fixture to connect the segments during the assembly process.

According to an alternative aspect of the invention, a spring assembly may be formed using a plurality of springs according to the invention connected together in series. Such an assembly can easily be arranged to have much greater stiffness against non-axial components of deflection than a single spring.

According to a further alternative aspect of the invention, there is provided a kit for constructing a spring according to embodiments of the invention, comprising: an inner hub and an outer hub, physically separate from each other; a plurality of resilient connecting arms, physically separate from each other and from said inner and outer hubs and connectable at an inner end to said inner hub and at an outer end to said outer hub, said plurality of resilient connecting arms being configured when attached to provide a restoring force parallel to said symmetry axis when said inner and outer hubs are displaced relative to each other along said symmetry axis.

According to a further alternative aspect of the invention, there is provided a piston/cylinder assembly comprising: a spring according to embodiments of the invention; a cylinder connected to one of said inner and outer hubs of said spring; a piston connected to the other one of said inner and outer hubs of said spring and configured to move longitudinally within said cylinder; wherein: said spring is arranged to guide relative motion of said piston within said cylinder such that a constant clearance is maintained between said piston and said cylinder.

According to a further alternative aspect of the invention, there is provided a method of manufacturing a spring having a substantially planar form in an unloaded state and rotational symmetry of at least order two about a symmetry axis perpendicular to the plane of the spring, said method comprising: providing as physically separate elements an inner hub, an outer hub and a plurality of resilient connecting arms; arranging said inner hub so as to be radially inward with respect to said outer hub; connecting each of said plurality of resilient connecting arms at an inner end to said inner hub and at an outer end to said outer hub such that said plurality of resilient connecting arms provide a restoring force parallel to said symmetry axis when said inner and outer hubs are displaced relative to each other along said symmetry axis.

Embodiments of the invention will now be described, by way of example only, with reference to the accompanying drawings in which corresponding reference symbols indicate corresponding parts, and in which.

Figure 1:
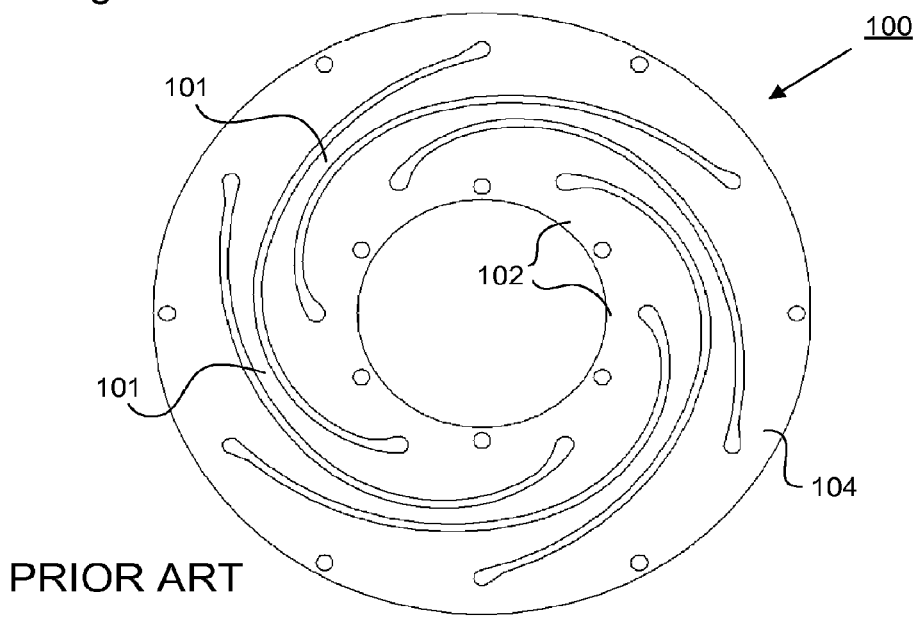
FIG. 1 depicts a single piece spiral spring according to the prior art.
Figure 2:
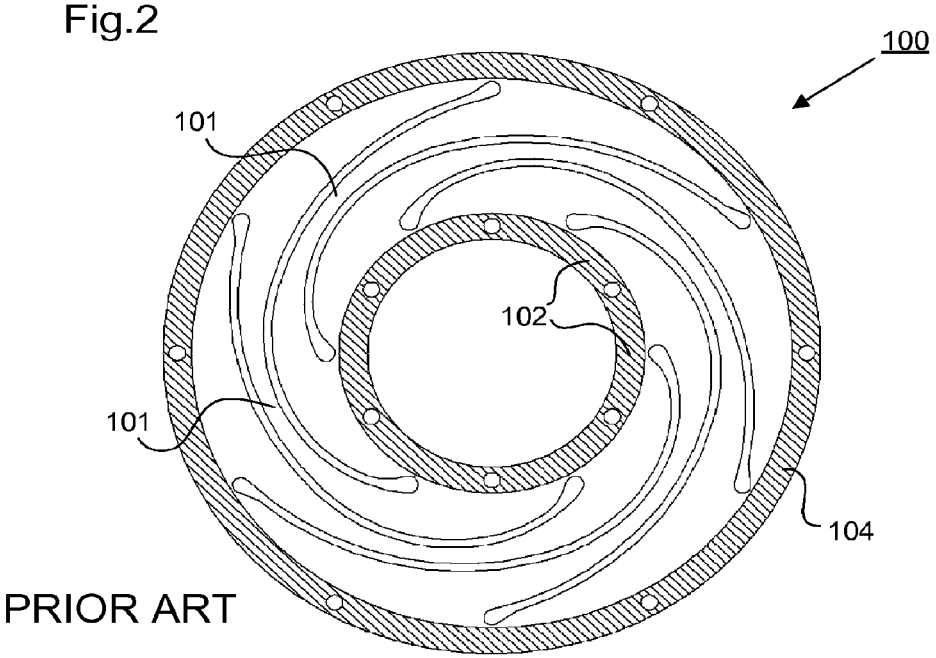
FIG. 2 shows the locations of clamping regions in the inner and outer regions of the spiral spring of FIG. 1.
Figure 3:
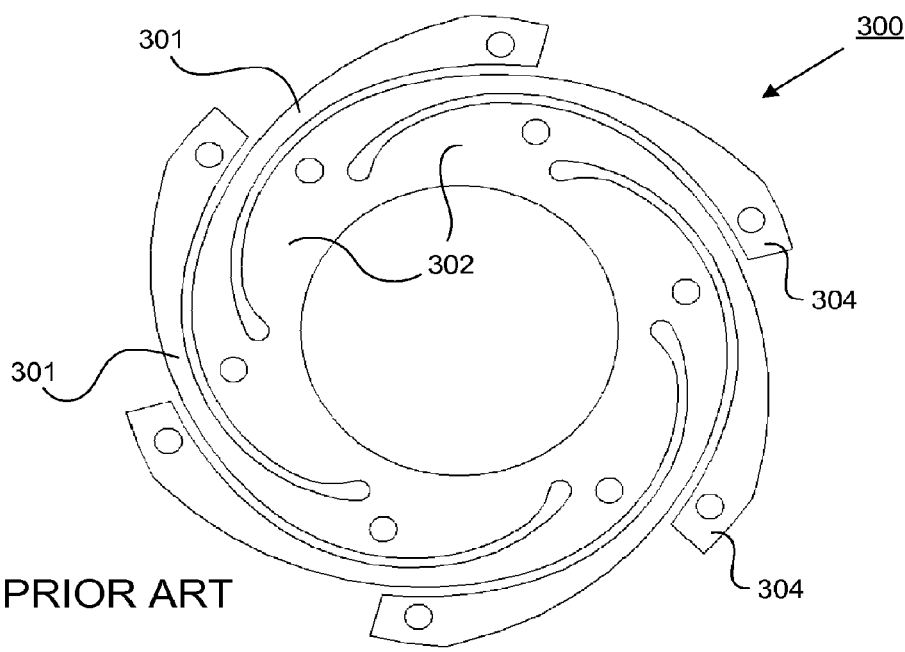
FIG. 3 depicts an alternative single piece spiral spring.
Figure 4:
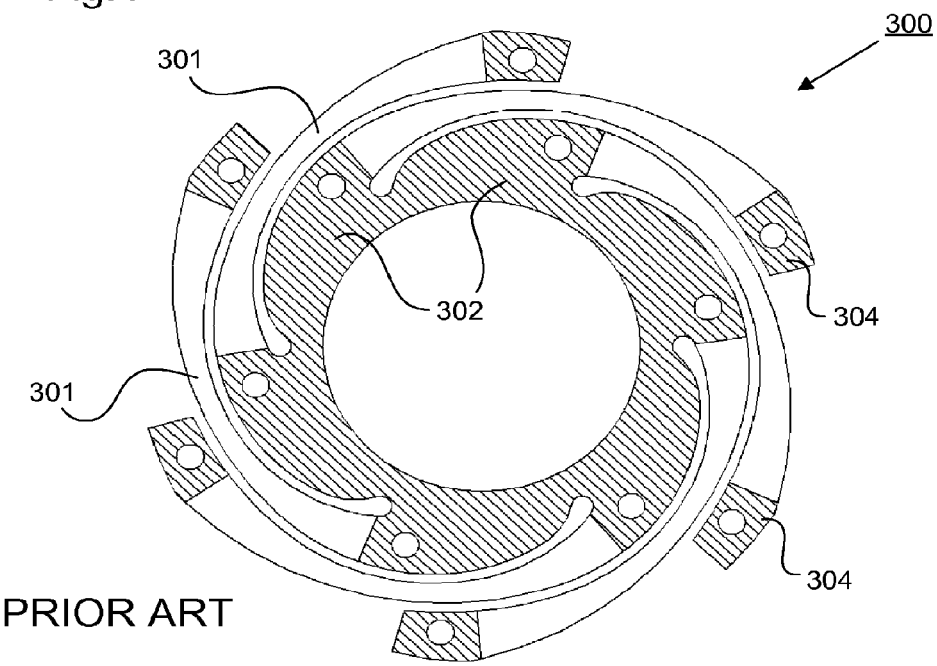
FIG. 4 shows the locations of clamping regions in the inner and outer regions of the spiral spring of FIG. 3.
Figure 5:
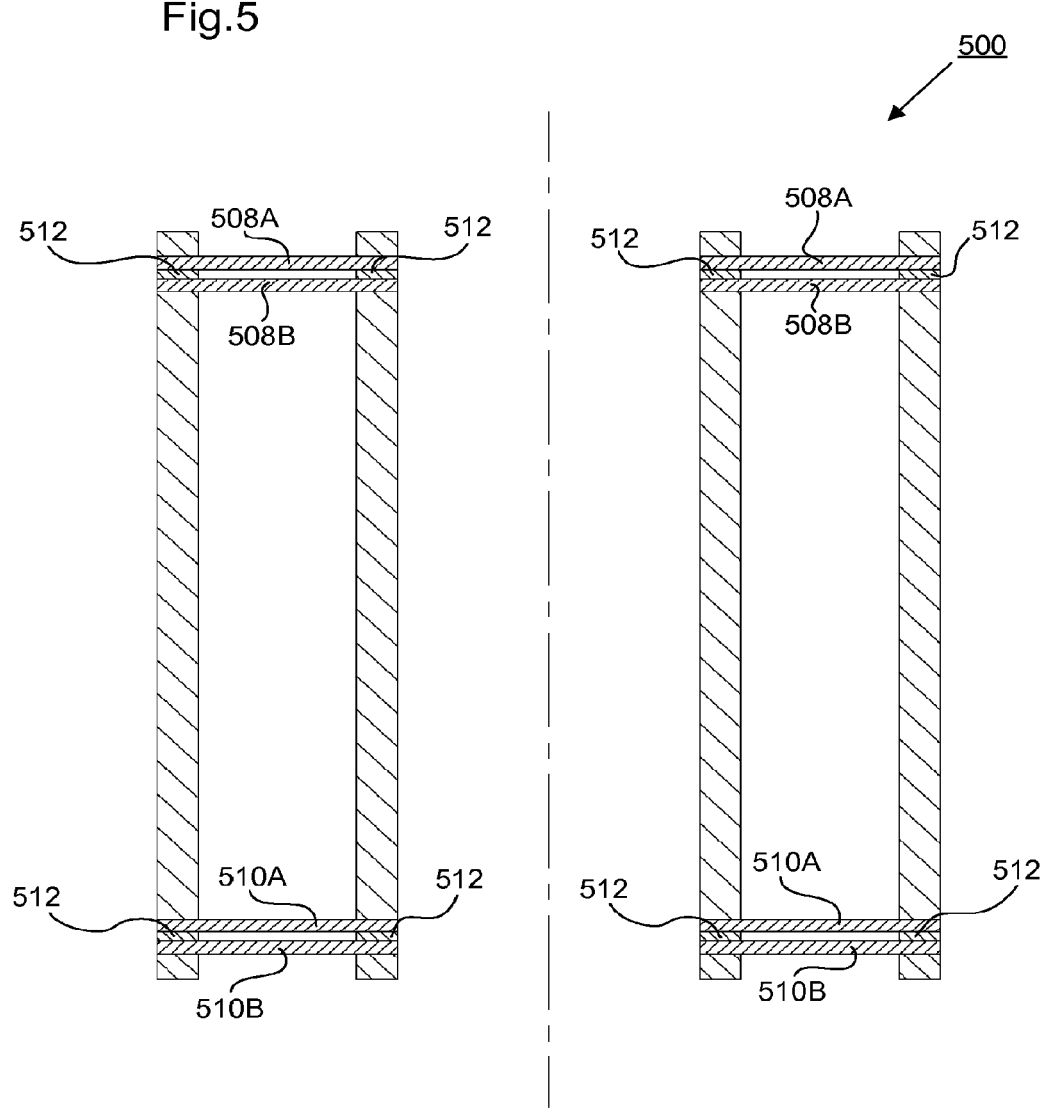
FIG. 5 shows a linear bearing assembly using axially separated sets of spiral springs.
Figure 6:
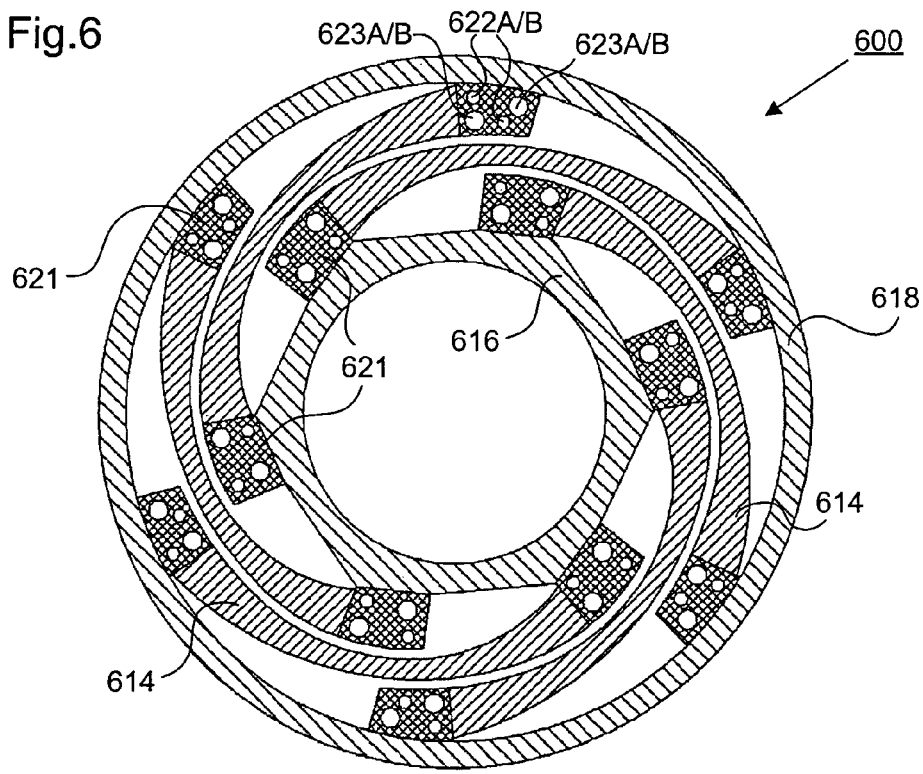
FIG. 6 shows a spring according to an embodiment of the invention.
Figure 7:
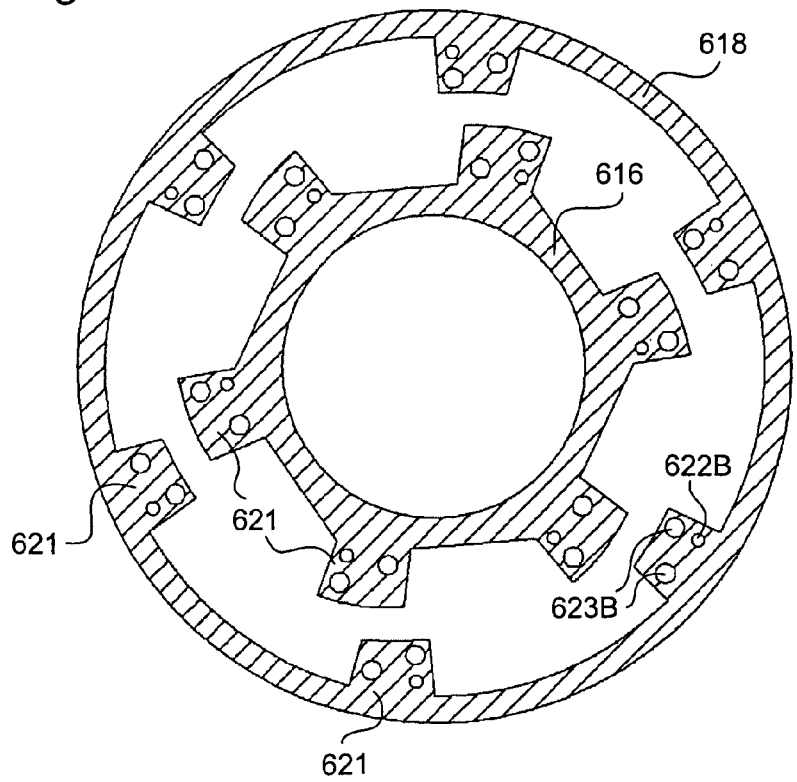
FIG. 7 shows the inner and outer hubs of the spring of FIG. 6 without the attached resilient connecting arms.

FIG. 6 shows a plan view of a spring 600 according to an embodiment of the invention, consisting of a number of separate resilient connecting arms 614 that are attached at inner and outer planar attachment regions to inner and outer hubs, 616 and 618 respectively, via shims and clamps (to be positioned in cross-hatched "clamping areas" 621). The planes of the inner and outer planar attachment regions are generally perpendicular to the longitudinal, load bearing, symmetry axis of the spring. FIG. 7 shows the profiles of the inner and outer hubs 616/618 with the resilient connecting arms 614, shims and clamps removed.

Figure 8:
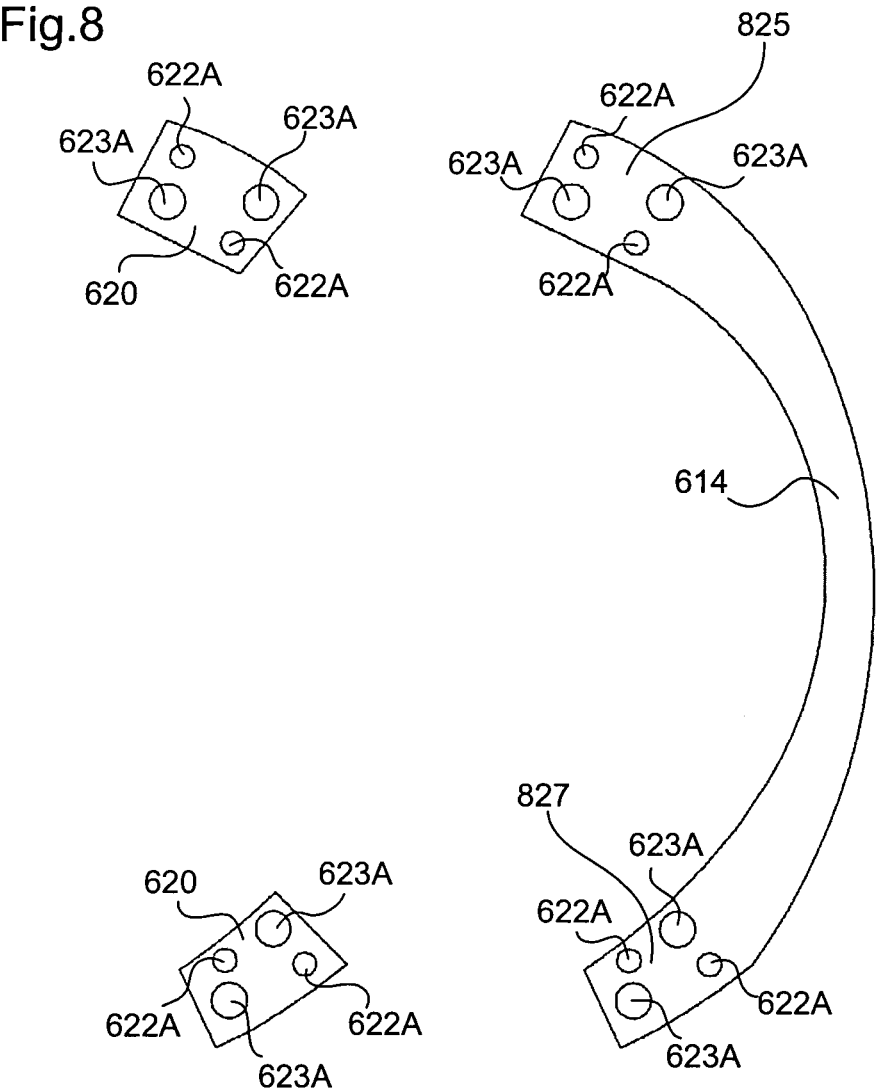
FIG. 8 shows an example of a resilient connecting arm and a corresponding profile for shims and clamping plates.

The individual resilient connecting arms 614 with their inner and outer planar attachment regions 825/827; and profiles 620 for the shims and clamping plates are shown in FIG. 8.

In general, the resilient connecting arms 614 are not restricted to having a particular profile but in the embodiment shown the resilient connecting arms 614 are curved with profiles that taper towards the middle (i.e. they are "waisted"). The curvature allows a degree of rotation to occur between the inner and outer hubs 616/618 during flexing and helps reduce the stress in the resilient connecting arms 614. The waisted profile likewise helps reduce the peak stress. In this example, the waisted profile allows the six resilient connecting arms 614 to nest together to provide a flexing connection similar to that provided by a single one piece spiral spring (see FIGS. 1 to 4 for example).

Similarly, the shape 620 of the shims and clamping plates and that of the clamping areas 621 on the inner and outer hubs 616/618, and the inner and outer planar attachment regions 825/827 (which may optionally match the shape 620 of the shims and clamping plates) are not in general restricted to a particular profile. The clamping area 621, inner and outer attachment regions 825/827, and shims and clamping plates should generally be sufficiently large, however, to contain the appropriate fastening and locating features desired. The shape is generally designed to suit the profile of the resilient connecting arm, but this need not be the case.

In the example shown in FIGS. 7 and 8, two larger holes 623A are provided in both ends of each resilient connecting arm 614, along with corresponding holes 623B in each of the corresponding clamping areas 621 on the inner and outer hubs 616/618, to allow access for fastening means. The fastening means may, for example, comprise screws that pass through the holes 623A in the connecting arms 614 and engage with threads in the corresponding holes 623B in the inner and outer hubs 616/618. Tightening of the screws causes the inner and outer attachment regions 825/827 of the resilient connecting arm 614 to be pressed in a longitudinal direction (i.e. parallel to the symmetry axis of the spring and perpendicular to the plane of the inner and outer attachment regions 825/827) against the inner and outer hubs 616/618.

Two smaller holes 622A are provided in both ends of the resilient connecting arms 614 to act as part of an alignment mechanism. A corresponding hole 622B is provided in each of the clamping areas 621 on the inner and outer hubs 616/618. Optionally, larger holes could be used for the alignment mechanism and smaller holes to accommodate fastening means, or the holes for fastening and alignment could be the same size, or even shared (see below).

In general, the alignment mechanism needs to comprise two elements: features that align the resilient connecting arms 614 with respect to the inner and outer hubs 616/618, which may be referred to as "hub location features", and features that align the resilient connecting arms 614 with each other to form "stacks" of arms 614 parallel to the symmetry axis of the spring 600, which may be referred to as "stack location features". The hub and stack location features can provide both positional and angular alignment. The stack location features may also align shims inserted between the resilient connecting arms 614 in a given stack, as well as any clamping plates that are positioned at the axial extremities of the stacks.

In preferred embodiments, either or both of the hub and stack location features may comprise cylindrical holes 623 for cooperation with cylindrical alignment members (e.g. dowels) that are a close fit with the cylindrical holes.

In the example shown in FIGS. 6 and 7, both of the smaller holes 622A are effective for aligning the resilient connecting arms 614 (and any shims or clamping plates) with each other within the stack while only one of the two smaller holes 622A need be used for aligning the resilient connecting arms 614 with the inner and outer hubs 616/618. This is why the clamping areas 621 contain only a single smaller hole 622B, for cooperation with the one of the two smaller holes 622A that is used for hub alignment. Cylindrical alignment members may be inserted into both of the smaller holes 622A at each end of the connecting arms 614, but only one of the two cylindrical alignment members will penetrate into a hole 622B in the inner or outer hub 616/618.

Figure 9:
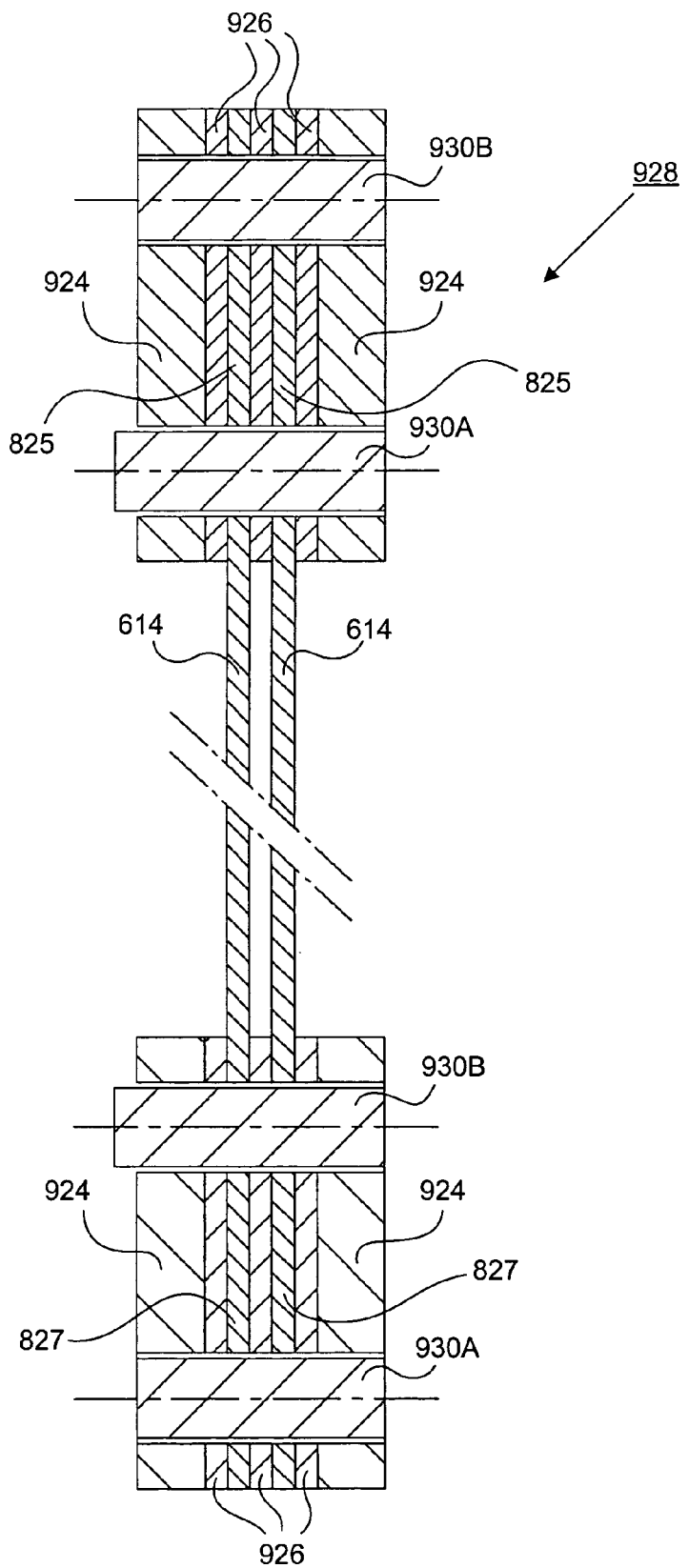
FIG. 9 shows a resilient connecting arm stack comprising two resilient connecting arms.
Figure 10:
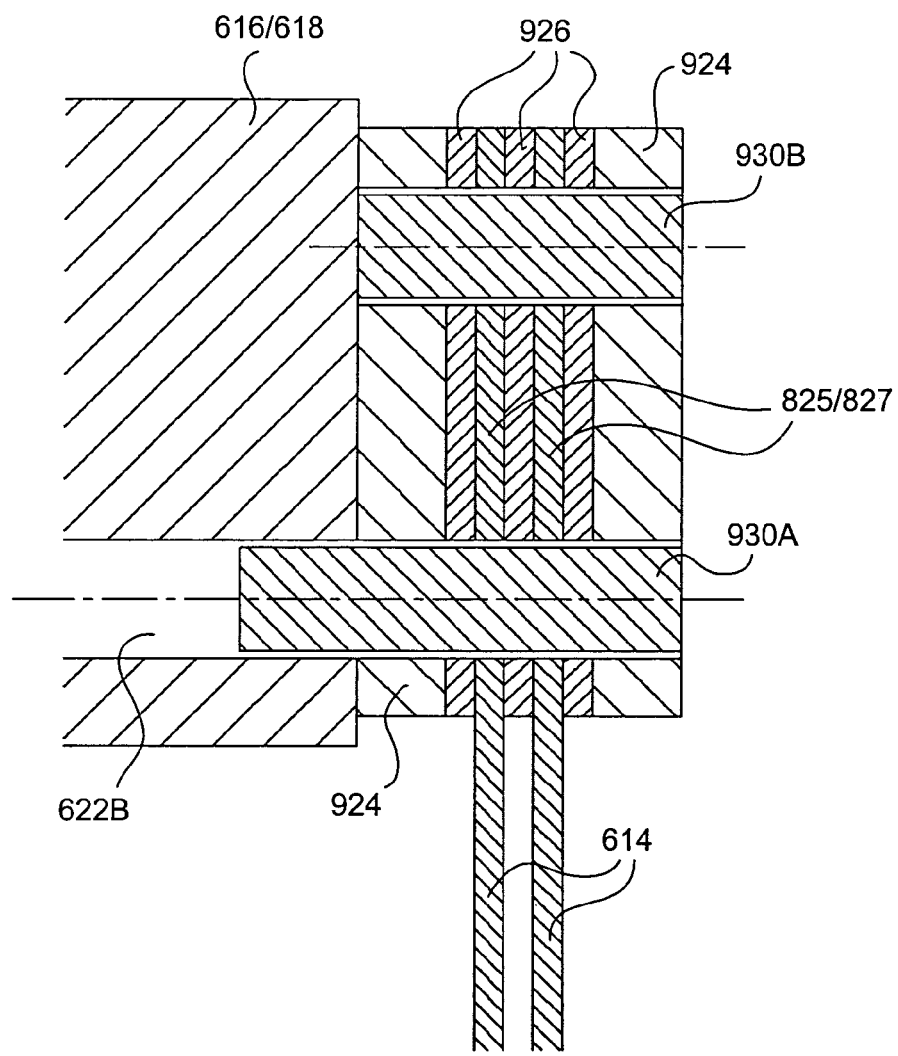
FIG. 10 shows how a resilient connecting arm stack may be connected and aligned with an inner or outer hub.

This arrangement can be seen in more detail in FIGS. 9 and 10.

FIG. 9 shows a side view of how the resilient connecting arms 614, clamping plates 924 and shims 926 can be stacked together to form resilient connecting arm stacks or sub-assemblies 928. In the example shown, the stack 928 comprises two resilient connecting arms 614, but more could be included if desired. Two cylindrical alignment members 930A/B at each end of the resilient connecting arm 614 are used to achieve stack alignment.

The orientation of the inner and outer planar attachment regions 825/827 perpendicular to the longitudinal symmetry axis of the spring (which is directed towards the right of the page in FIG. 9) can clearly be seen.

FIG. 10 shows how the ends of each resilient connecting arm stack 928 may be connected to the inner or outer hub 616/618 via the inner and outer planar attachment regions 825/827. In this instance, the location on the hub 616/618 is provided by one of the cylindrical alignment members 930A penetrating through into the corresponding hole 622B in the hub 616/618. Thus, the cylindrical alignment members 930A and corresponding holes 622A in the resilient connecting arms 614, shims 926 and clamping plates 924 contribute both to hub alignment and stack alignment.

Once the resilient connecting arms 614 are secured to the hubs 616/618 by suitable fasteners it is possible to release either or both of the hub and stack location features. For example, where cylindrical alignment members 930 are used, these may be removed. Alternatively, the hub and stack location features can remain partially or completely in place (e.g. a subset or all of the cylindrical alignment members 930A/B may remain inserted), which may help to prevent loss of alignment during use. Elements such as the cylindrical alignment members 930A/B may be secured in place, for example by means of adhesive.

Although it is possible to use single fasteners for clamping/attaching each end of the resilient connecting arms 614, it is found that a better attachment is achieved if two fasteners are used. This is why two holes 623A/B are provided in each end of the connecting arms 614 and in each clamping area 621 in the example shown in FIG. 6. In the operation of the spring 600 (i.e. on axial displacement of the inner hub 616 relative to the outer hub 618), there is a small rotation of the inner hub 616 relative to the outer hub 618 associated with the flexing of the resilient connecting arms 614. This rotation produces bending moments parallel to the spring's axis that would tend to twist each resilient connecting arm 614 with respect to its clamped areas. In a one-piece spiral spring, the bending moment is adequately resisted by the solid connection between the inner clamping areas. In the separate resilient connecting arm design described here, this solid connection does not exist and the moment has to be resisted by the clamping mechanism. It is difficult to provide sufficient resistance to this torque using only a single fastener. Two fasteners (or more) are more able to provide adequate resistance and the risk of the connection coming undone can be more easily reduced.

Figure 11:
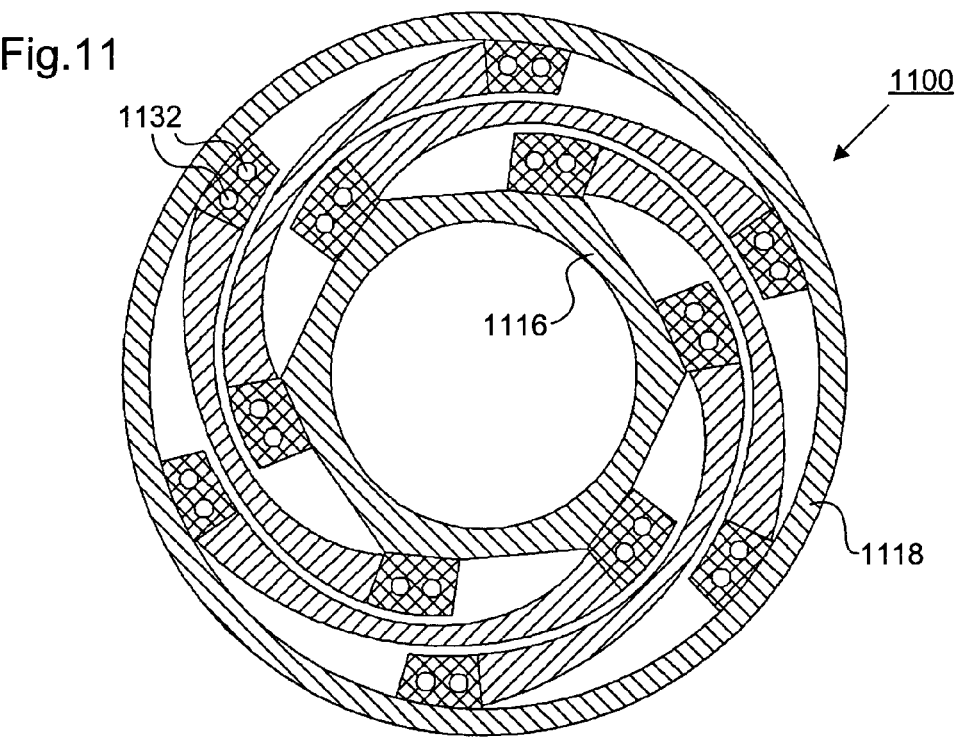
FIG. 11 shows a spring according to an alternative embodiment, with a reduced number of alignment holes.
Figure 12:
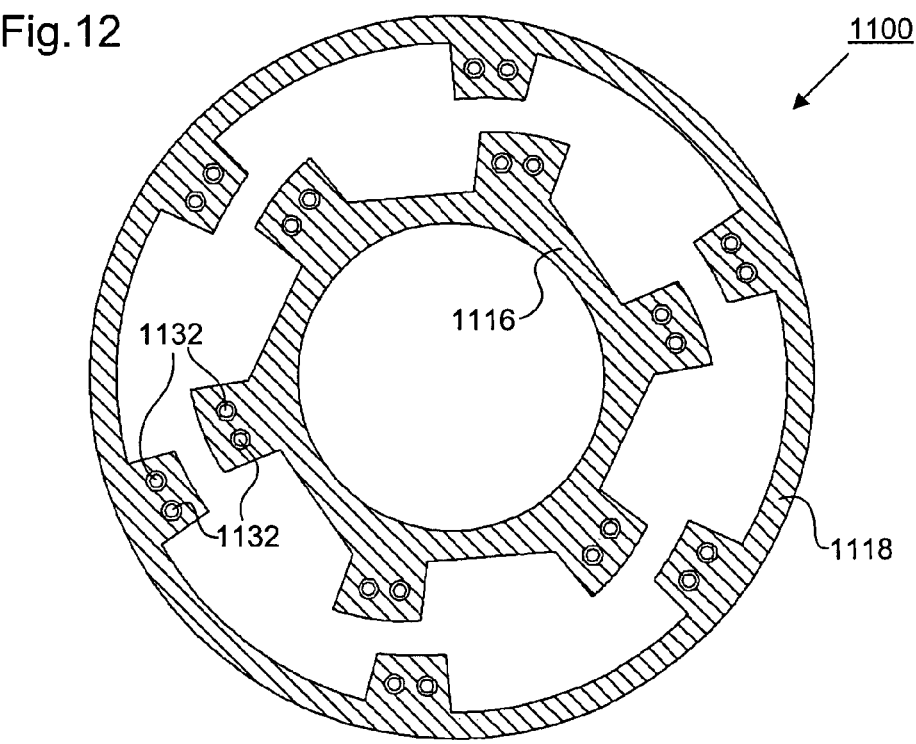
FIG. 12 shows the inner and outer hubs of the spring of FIG. 11 without the attached resilient connecting arms.

A further variation is to use the same holes for alignment (e.g. for insertion of a dowel) and for fastening (e.g. as clearance holes for a screw). FIG. 11 shows a plan view of such a spring 1100. FIG. 12 shows the inner and outer hubs, 1116 and 1118 respectively, with the combined alignment and fastener holes 1132. All the possible locations in the hubs 1116/1118 are shown, but in practice only one of each pair of combined location and fastener holes 1132 would be used to locate the resilient connecting arm assembly onto a hub 1116/1118. The advantage of reducing the number of holes required in the limited extent of the clamping area is that it allows larger fasteners to be used. This is particularly helpful for small machines where it is preferable to avoid the use of very small fasteners (e.g. M1.6).

Figure 13:
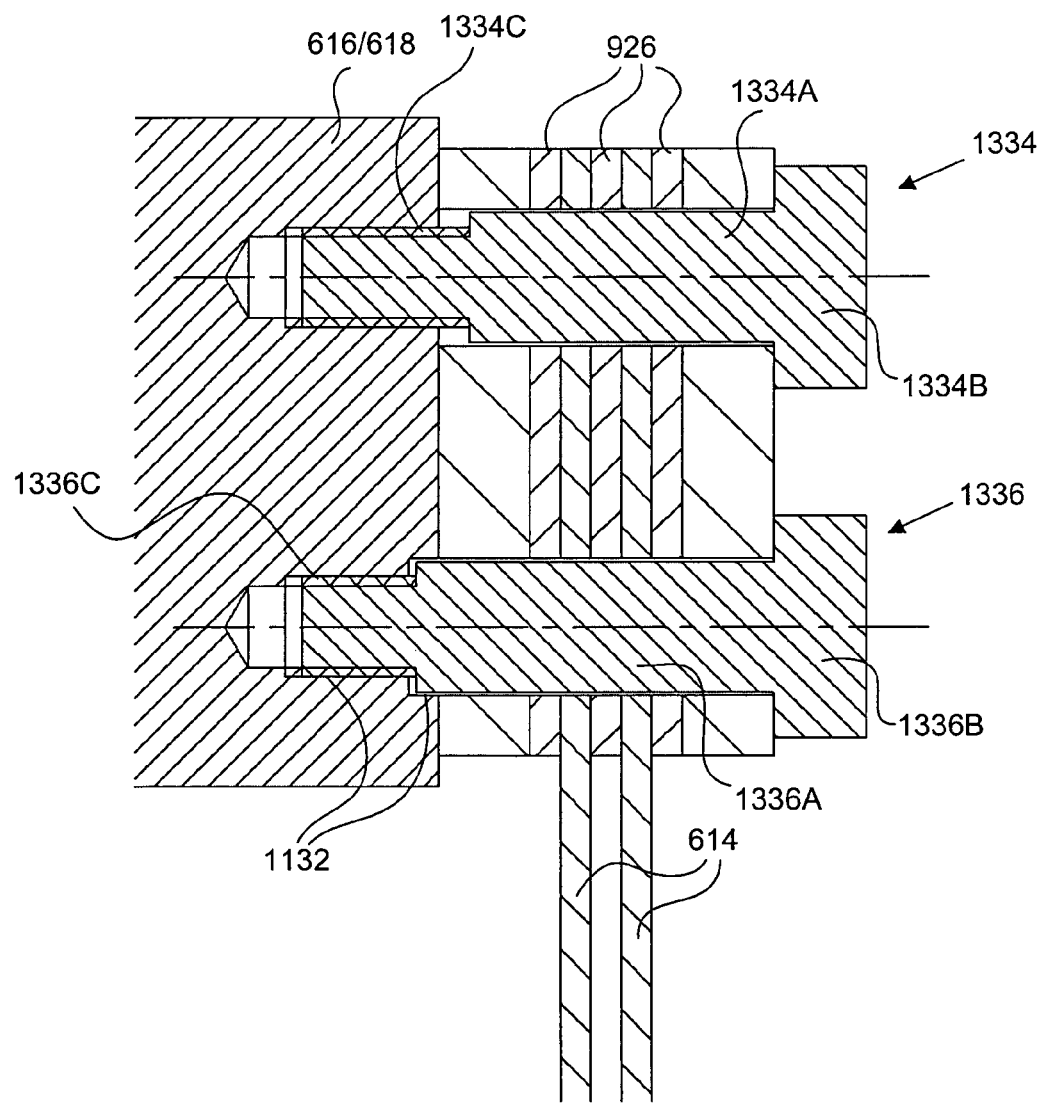
FIG. 13 illustrates the use of shoulder screws to carry out fastening and aligning of the resilient connecting arms with themselves and/or with the inner or outer hubs.
Figure 14:
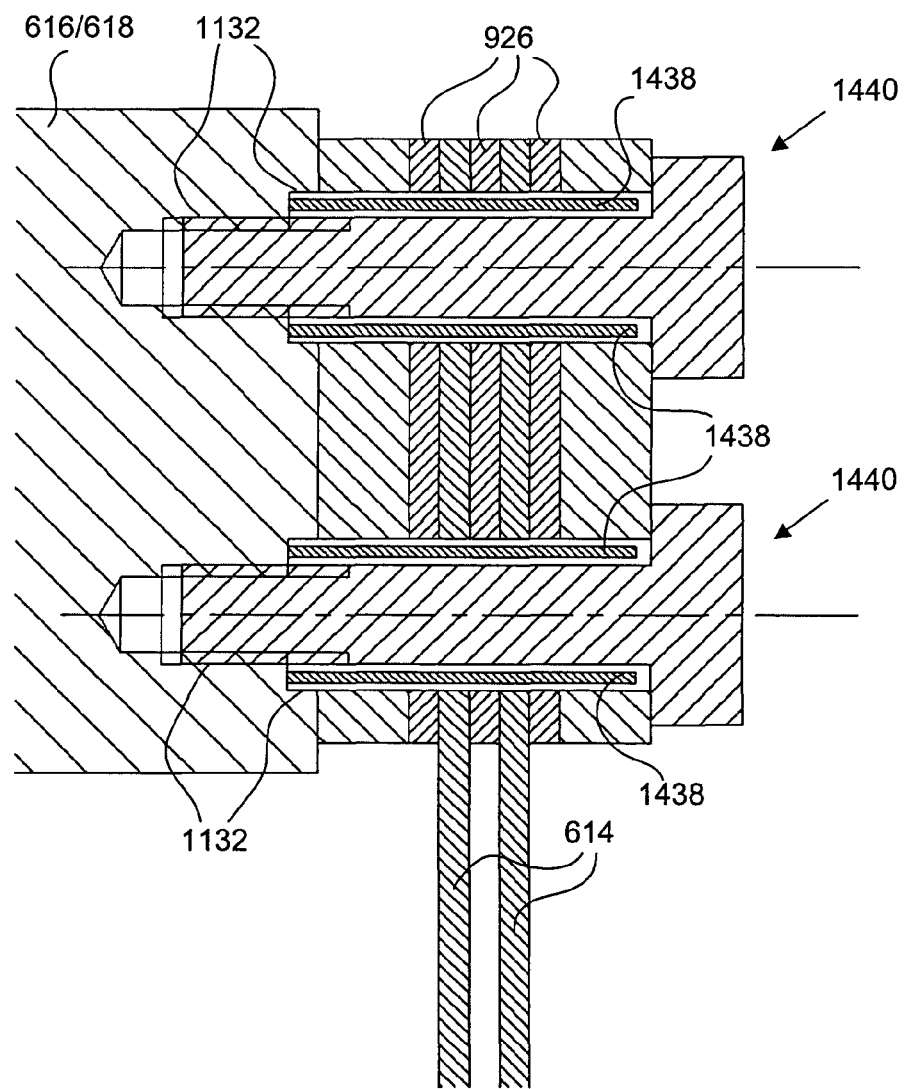
FIG. 14 illustrates the use of cylindrical tubes in combination with threaded fasteners for carrying out fastening and aligning of the resilient connecting arms with themselves and/or with the inner or outer hubs.

Two possible approaches for combining the alignment and fastener holes are shown in FIGS. 13 and 14. FIG. 13 shows the use of shoulder screws 1334/1336. These are screws with an accurately sized plain cylindrical surface 1334A/1336A below the screw head 1334B/1336B but before the thread 1334C/1336C starts. The plain cylindrical section 1334A/1336A is sized to engage in a combined alignment and fastener hole 1132 and acts as a dowel to provide the alignment required. The combined alignment and fastener hole 1132 comprises a threaded portion to provide fastening and a non-threaded portion for engaging with the plain cylindrical section 1334A/1336A of the shoulder screw 1334/1336A to provide alignment. A challenge with this approach is constructing the shoulder screws 1334/1336 in a sufficiently precise manner. Not only does the outside diameter of the plain cylindrical surface 1334A/1336A need to be accurately defined, but also its relation (accurately coaxial) to the axis of the screw thread 1334C/1336C. This may be made more difficult by the fact that the choice of material for the plain cylindrical surface 1334A/1336A is constrained by the need for the material also to be suitable for forming the thread. In addition, care needs to be taken to ensure that deformation of the screw during tightening does not compromise alignment. Overall, these difficulties mean that shoulder screws of the required accuracy will be significantly more expensive than standard fasteners.

An alternative embodiment that allows standard fasteners to be used is shown in FIG. 14. The alignment is achieved through the use of short lengths of cylindrical tubes 1438 that are sized to give accurate engagement in the combined alignment and fastener holes 1132 holes. The fasteners 1440 are a clearance fit inside the alignment tubes 1438, so they have no influence on the alignments.

In an alternative embodiment the springs are aligned using features other than holes and dowels or cylindrical tubes. Examples of such features are straight edges or notches formed at the ends of the resilient connecting arms 614 and arranged to cooperate with corresponding features forming in the clamping areas 621 of the inner and outer hubs 616/618.

As mentioned above, alignment of the resilient connecting arm stacks 928 with respect to the hubs 616/618 can be achieved through the use of location features that are also used to align the resilient connecting arms 614 with each other and with the shims 926 and clamping plates 924. In such an arrangement, if the inner and outer hubs 616/618 of the spring are connected, for example, by three resilient connecting arm stacks (or three resilient connecting arms that are not in stacks), with single locations at each end, then the spring geometry is fully defined. It follows from this that if there are only two resilient connecting arm stacks then an additional alignment feature is required to define the spring geometry. Where more than one alignment hole is available at each end of the resilient connecting arm stacks, the additional location may be implemented using any one of the unused holes.

It also follows that if the spring has more than three resilient connecting arm stacks (or connecting arms not in stacks) then the use of all the alignment holes could (if each of the alignment holes is arranged to prevent movement in all directions within the plane of the spring) over-constrain the system, which will tend undesirably to stress the spring and reduce its performance and/or longevity. Alignment features (e.g. an alignment hole for use with a corresponding dowel) that prevent movement in all directions with the plane of the spring may be referred to as "fully-constraining location features".

Figure 15:
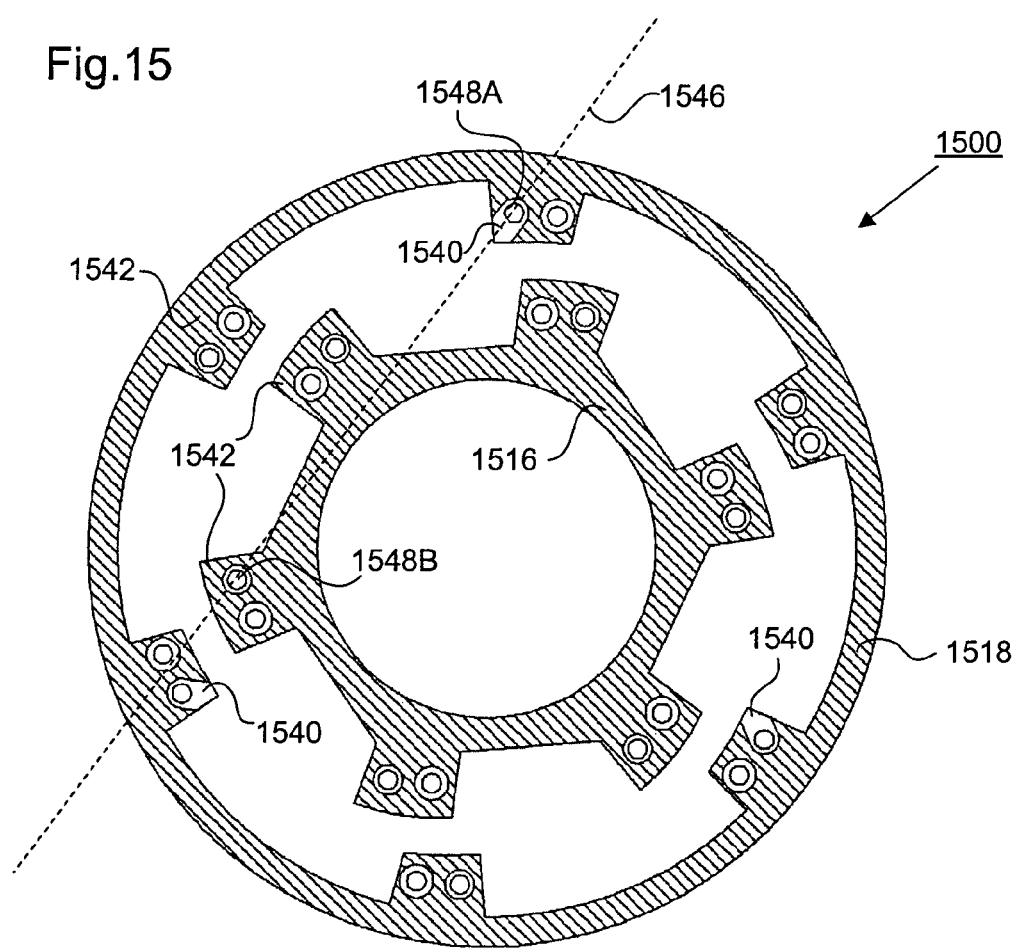
FIG. 15 depicts the inner and outer hubs in an embodiment using a combination of fully-constraining location features and partially-constraining location features in the form of slots.

FIG. 15 shows the inner and outer hubs, 1516 and 1518 respectively, for a spring 1500 having six resilient connecting arm stacks 1528. The resilient connecting arms are not shown, but would be connected in a configuration similar to that of FIG. 11. Over-constraining of the geometry is avoided by replacing three of the alignment holes in the clamping areas 1542/1544 with alignment slots 1540. The slots 1540 give an extra degree of freedom in their engagement with alignment dowels/tubes. Alignment features (e.g. an alignment slot for use with a corresponding dowel) that provide a degree of location but which allow relative movement in at least one direction within the plane of the spring may be referred to as "partially-constraining location features". In a preferred embodiment, the slot 1540 is aligned along the direction connecting the inner and outer connection points of the resilient connecting arm, for example along the dotted line 1546 connecting fastener clearance holes 1548A and 1548B. This ensures that the angular alignment is accurate and avoids uneven gaps between the individual resilient connecting arms while not over-constraining the system.

The slots 1540 can be placed on the clamping areas 1542 of the inner or outer hubs provided there is only one slot per resilient connecting arm. In the example shown in FIG. 15, the three alignment slots 1540 have been placed evenly around the outer hub. This approach can be applied to other designs that have different numbers of arms. It may not be possible to position the alignment slots evenly but this does not matter. For example, a spring with eight resilient connecting arms would require five location slots.

In general, a minimum of two resilient connecting arms is required to give the balanced axial deflection necessary for linear movement. Preferred embodiments will tend to have assemblies in which the resilient connecting arms are equispaced i.e. if there are six arms there will be six degrees of symmetry. However, it is also possible to have resilient connecting arm assemblies that are not equispaced providing that there are at least two degrees of rotational symmetry.

Figure 16:
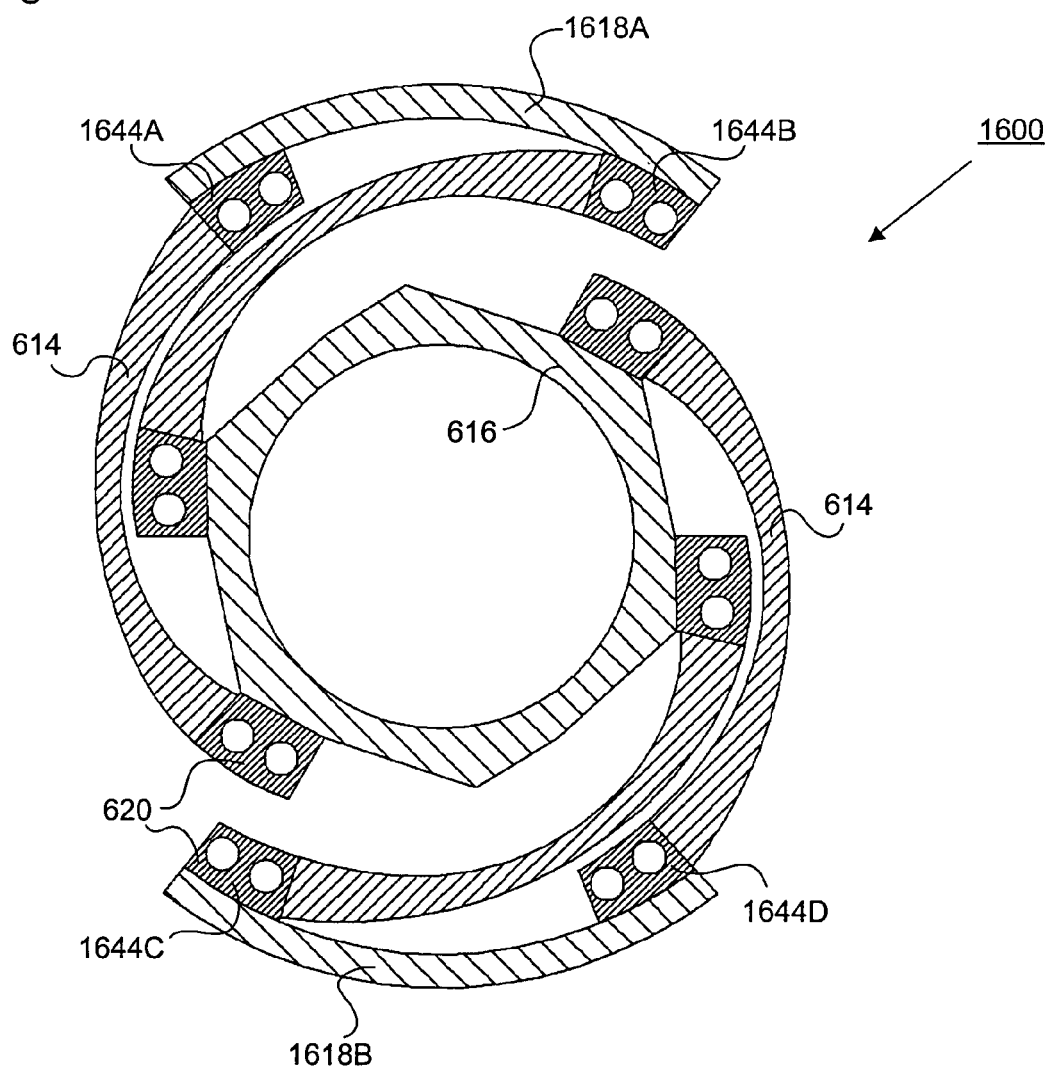
FIG. 16 depicts a spring where the order of rotational symmetry is less than the number of resilient alignment stacks and the spring envelope is elongated.

FIG. 16 shows an example of a spring 1600 having only four resilient connecting arms 614 of a six-arm configuration (such as that shown in FIG. 6, for example). The arrangement has rotational symmetry of order two, rather than of order six, which would be the case if all six resilient connecting arms were used. The inner hub 616 may have a similar construction to the inner hub of the six-arm configuration. The outer hub 1618A/1618B, on the other hand, can advantageously be segmented rather than fully annular so as not to extend unnecessarily in the direction of the missing resilient connecting arms. More specifically, the outer hub 1618A/1618B may be constrained to extend (i.e. connect directly) only between the outer clamping areas that are nearest neighbours with each other, for example between clamping areas 1644A and 1644B for outer hub segment 1618A and between clamping areas 1644C and 1644D for outer hub segment 1618B. The resulting geometry still has two degrees of rotational symmetry and is capable of defining an accurate linear movement. One advantage of this arrangement is that it allows a linear dimension to be reduced and hence enables a more compact envelope.

Alternative embodiments can employ means other than threaded fasteners to clamp the assembly. For instance, in the resilient connecting arm stacks (such as that in FIG. 9, for example), the resilient connecting arms, shims and/or clamp plates can be held together by adhesive, by mechanical means other than those already mentioned, e.g. riveting, and/or by metallurgical bonding means, e.g. soldering, brazing or welding. Likewise, the resilient connecting arm stacks could by secured to the outer and/or inner hubs by adhesive, by mechanical means other than those already mentioned, e.g. riveting, and/or by metallurgical bonding means, e.g. soldering, brazing or welding.

It will be noted that embodiments of the invention involve the assembly of a large number of individual components. For example for the equivalent of 3 springs there may be 138 components. This high component count may seem a disadvantage. However, there are only six distinct components to be manufactured and the invention is well suited to automated assembly. For example, the sub-assembly 928 of FIG. 9 could be easily assembled robotically as a process that is separate from the main assembly. There are various means possible for holding the sub-assembly 928 together for easy handling. For example, the alignment tubes could be bonded to the top and bottom plates. Alternatively, components can be used to provide sufficient friction on the alignment tubes to hold the stack together—examples might be small polymer "olives" between the tube and plate or shims that are slotted and can act as circlips.

It will also be noted that the inner and outer hubs may be individual components that allow a free-standing spring to be assembled. Alternatively, it is also possible for either or both of the hubs to be integrated into other components. In the latter case, the spring assembly cannot be separated from the assembly of the complete machine and a free-standing spring does not exist as a separate entity.

Figure 17:
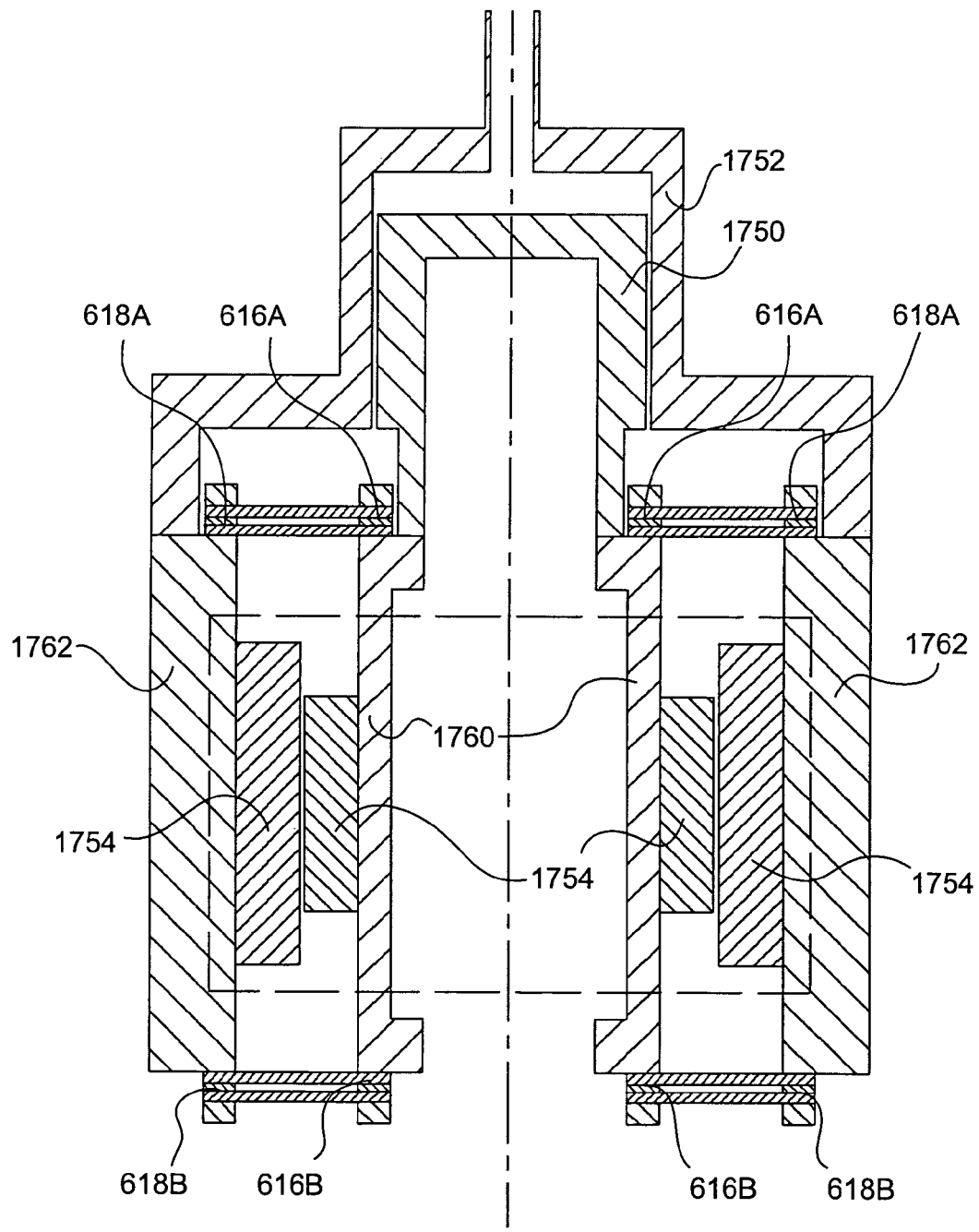
FIG. 17 depicts a sectional view of a piston/cylinder assembly using springs according to embodiments of the invention.

FIG. 17 is a sectional view of a piston/cylinder assembly using springs according to embodiments of the invention. The two or more sets of springs are axially aligned, spaced apart and connected together to provide the required stiffness against off-axis distortions and ensure accurate linear motion. The springs are generally connected together such that their forces act in parallel. The inner hubs 616A/B are connected together via inner connector 1760 and the outer hubs 618A/B are connected together via outer connector 1762. The inner connector 1760 and inner hubs 616A/B are fixedly connected to the piston 1750 and the outer connector 1762 and outer hubs 618A/B are fixedly connected to the cylinder 1752. Means 1754 are provided for applying an axial force between the inner and outer connectors 1760/1762 (e.g. using an electromagnetic linear transducer), which causes a corresponding axial movement of the piston 1750 within the cylinder 1752, which is guided by the springs so that a constant clearance is maintained between the cylinder 1752 and the piston 1750. This arrangement can be used as the basis for various machines, such as long-life lubricant free pumps, compressors, Stirling cycle cryo-coolers, or Stirling engines, for example.

To help achieve precisely linear axial movement between the inner and outer hubs 616/618, the resilient connecting arms 614 should, in addition to the hub alignment and stack alignment discussed above, be aligned with respect to a plane perpendicular to the axis of linear motion. An example of such alignment might lead to the following constraints: 1) the surface of the inner hub 616 should be flat (if formed from separate elements, the surfaces of those elements should be flat and coplanar with each other); 2) the surface of the outer hub 618 should be flat (if formed from separate elements, the surfaces of those elements should be flat and coplanar with each other); and 3) the inner hub 616 should be coplanar with the outer hub 618 (or the surfaces of the members of the inner and outer hubs 616/618 should be coplanar).

An alignment of this nature could be achieved, for example, by means of an alignment fixture consisting of a plate with one surface machined flat. The flat face of this fixture could be fastened to the surfaces of both the inner and the outer hubs 616/618, thereby ensuring that all the surfaces are coplanar. While the fixture is attached in this fashion, the resilient connecting arms 614 could be mounted to the inner and outer hubs 616/618 and fastened in place. The fixture could then be removed.

The invention claimed is:

1. A spring having a substantially planar form in an unloaded state and rotational symmetry of at least order two about a symmetry axis perpendicular to the plane of the spring, said spring comprising:

an inner hub and an outer hub, said inner hub being radially inward with respect to said outer hub;

a plurality of resilient connecting arms, each connected via an inner planar attachment region at an inner end to said inner hub and via an outer planar attachment region at an outer end to said outer hub, the planes of said inner and outer planar attachment regions being perpendicular to said symmetry axis, said plurality of resilient connecting arms being configured to provide a restoring force parallel to said symmetry axis when said inner and outer hubs are displaced relative to each other along said symmetry axis; wherein said inner hub, said outer hub and each of said plurality of resilient connecting arms are formed as physically separate elements and are connected to each other during assembly to form said spring, the spring further comprising non-pivotable fastening means for fastening said plurality of resilient connecting arms to said inner and outer hubs, said non-pivotable fastening means being configured to apply a fastening force that presses said inner and outer planar attachment regions against the inner and outer hubs in a direction parallel to said symmetry axis so as to prevent pivoting of the resilient connecting arms about said inner and outer planar attachment regions about an axis parallel to said symmetry axis.

2. A spring according to claim 1, further comprising hub location features for aligning said resilient connecting arms relative to said inner and outer hubs.

3. A spring according to claim 2, wherein said hub location features comprise cylindrical holes in said resilient connecting arms and inner and outer hubs for cooperation with cylindrical alignment members insertable within said cylindrical holes.

4. A spring according to claim 1, wherein said resilient connecting arms are arranged in a plurality of stacks, each resilient connecting arm in a given stack being aligned with all of the other resilient connecting arms in the same stack along a direction parallel to said symmetry axis.

5. A spring according to claim 1, wherein said non-pivotable fastening means comprise screws engaging with threaded holes in said inner and outer hubs via corresponding holes in said resilient connecting arms, and wherein said non-pivotable fastening means are configured to perform both of: 1) fastening said resilient connecting arms to said inner and outer hubs; and 2) aligning said resilient connecting arms with said inner and outer hubs or aligning said resilient connecting arms with each other within a given stack.

6. A spring according to claim 5, wherein said screws comprise an elongated shoulder portion having a plain cylindrical outer surface engaging against the cylindrical inner surface of holes in said resilient connecting arms so as to align the resilient connecting arms within each stack with each other.

7. A spring according to claim 6, wherein said threaded holes comprise a non-threaded portion having a cylindrical inner surface and a threaded portion, said elongated shoulder portions engaging against the cylindrical inner surface of said non-threaded portions of said threaded holes so as to align said resilient connecting arms with said inner and outer hubs.

8. A spring according to claim 5, further comprising cylindrical tubes around the outside of the threaded portions of said screws, the outer surface of said cylindrical tubes engaging against the cylindrical inner surface of holes in said resilient connecting arms so as to align resilient connecting arms in each stack with each other.

9. A spring according to claim 8, wherein said threaded holes comprise a non-threaded portion having a cylindrical inner surface and a threaded portion, said cylindrical tubes engaging against the cylindrical inner surface of said non-threaded portions of said threaded holes so as to align said resilient connecting arms with said inner and outer hubs.

10. A spring according to claim 1, wherein said non-pivotable fastening means are configured to fix each end of said resilient connecting arms to said inner and outer hubs via at least two fixing points.

11. A spring according to claim 1, wherein each of said resilient connecting arms is tapered so as to be thinner in a region towards the middle of said arm relative to regions nearer said inner and outer ends of said arm.

12. A spring according to claim 4, wherein each of the resilient connecting arms in each stack is separated from other resilient connecting arms in the same stack by shims.

13. A spring according to claim 1, wherein the number of stacks of said resilient connecting arms, or the number of said resilient connecting arms if there are no stacks, is greater than the order of said rotational symmetry, and wherein said outer hub comprises a plurality of disconnected segments, each segment being attached only to outer ends of resilient connecting members that are nearest neighbours to each other.

14. A spring assembly comprising:
a plurality of springs according to claim 1, axially aligned, disposed as separated groups and connected together.

15. A piston/cylinder assembly comprising:
a spring according to claim 1;
a cylinder connected to one of said inner and outer hubs of said spring;
a piston connected to the other one of said inner and outer hubs of said spring and configured to move longitudinally within said cylinder; wherein:
said spring is arranged to guide relative motion of said piston within said cylinder such that a constant clearance is maintained between said piston and said cylinder.

16. A method of manufacturing a spring having a substantially planar form in an unloaded state and rotational symmetry of at least order two about a symmetry axis perpendicular to the plane of the spring, said method comprising:
providing as physically separate elements an inner hub, an outer hub and a plurality of resilient connecting arms;
arranging said inner hub so as to be radially inward with respect to said outer hub; and
connecting each of said plurality of resilient connecting arms via an inner planar attachment region at an inner end to said inner hub and via an outer planar attachment region at an outer end to said outer hub, the planes of said inner and outer planar attachment regions being perpendicular to said symmetry axis, such that said plurality of resilient connecting arms provide a restoring force parallel to said symmetry axis when said inner and outer hubs are displaced relative to each other along said symmetry axis; wherein
the step of connecting employs non-pivotable fastening means for fastening said plurality of resilient connecting arms to said inner and outer hubs, said non-pivotable fastening means being configured to apply a fastening force that presses said inner and outer planar attachment regions against the inner and outer hubs in a direction parallel to said symmetry axis so as to prevent pivoting of the resilient connecting arms about said inner and outer planar attachment regions about an axis parallel to said symmetry axis.

17. The spring according to claim 1, wherein the spring is adapted to provide a restoring force parallel to the symmetry axis with substantially no restoring forces off-axis to the symmetry axis upon the relative displacement of the inner and outer hubs along the symmetry axis.

18. The spring according to claim 1, wherein the spring is adapted to be substantially non-planar in a loaded state.

19. The spring according to claim 1, wherein the spring is adapted such that the position of each of the resilient connecting arms in a loaded state as projected onto the plane of the spring is substantially the same as the position of each of the respective resilient connecting arms in the plane of the spring in the unloaded state.

20. The spring according to claim 1, wherein the non-pivotable fastening means engage with corresponding holes in the resilient connecting arms and further wherein the resilient connecting arms further comprise hub location features comprising cylindrical holes, the cylindrical holes being different from the corresponding holes.

* * * * *